Aug. 27, 1957     B. A. McGUINNESS     2,804,530
ELECTRICAL COOKING DEVICES
Filed June 4, 1956
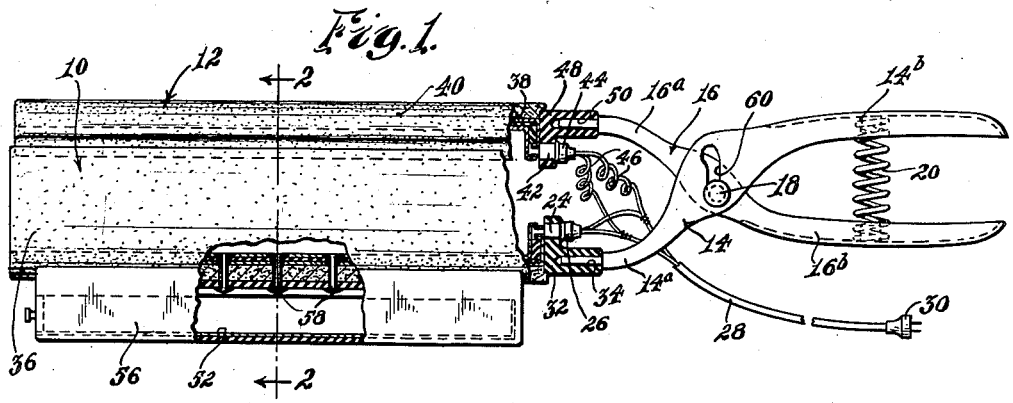
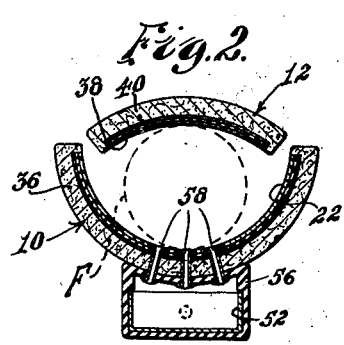 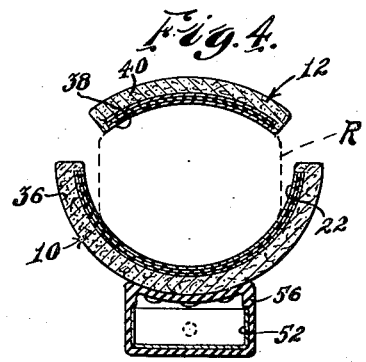
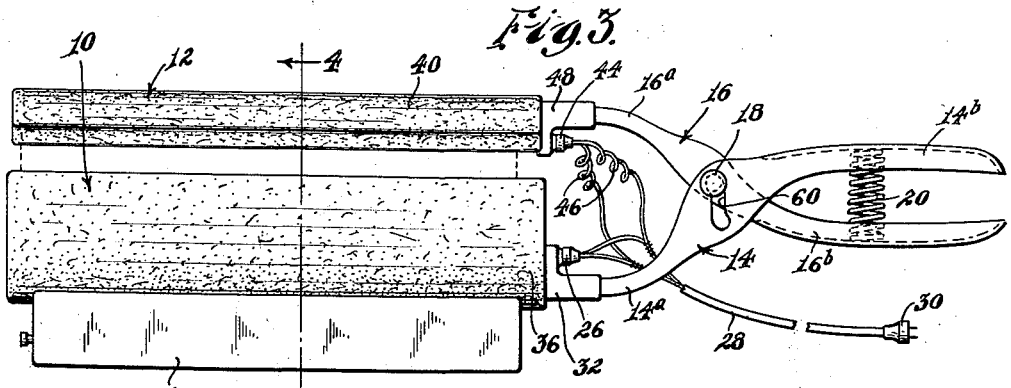
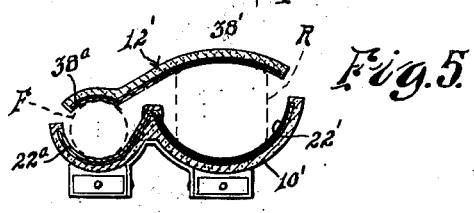
INVENTOR.
Bernard A. McGuinness
BY his Atty.

United States Patent Office 2,804,530
Patented Aug. 27, 1957

2,804,530

ELECTRICAL COOKING DEVICES

Bernard A. McGuinness, Brookline, Mass.

Application June 4, 1956, Serial No. 589,035

5 Claims. (Cl. 219—19)

This invention relates to improvements in electrical cooking devices, and provides more particularly a relatively small manually operable cooking implement which may be carried on the person and which is suitable for toasting sandwich rolls and cooking frankfurters, hamburg, and other fillers for sandwiches. For example, a workman conveniently may carry the cooking implement with him and prepare his own hot sandwiches by plugging it into any available electrical outlet.

Hence, it is among the objects of the invention to provide an electrical cooking implement having elongate pivoted jaws between which items of food may be manually engaged and held until suitably cooked or toasted, each jaw having electrical heating means therein detachably connected to different conductors of a conventional electric cord.

Another object of the invention is to provide an electrical cooking implement having a pair of generally trough-shaped pivotally connected jaws of which one jaw has dimensions and shape for entering appreciably within the other jaw when the jaws are actuated relatively toward each other, each jaw having a projecting handle portion which is detachable from the jaw when the implement is not in use.

A further object of the invention is to provide an electrical cooking implement having coacting heated jaws between which food items may be engaged, one of said jaws having a dip-container associated therewith and drain means whereby grease drains from the interior of the jaw into the drip-receptacle, the said receptacle being closed against escape of grease therefrom but being openable for getting access to accumulated grease, and for emptying the container.

It is, moreover, my purpose and object generally to improve the structure of portable cooking devices and especially manually operable electrical cooking implements suitable for cooking individual frankfurters, and other sandwich fillers, and for toasting individual sandwich rolls, and the like.

In the accompanying drawing:

Fig. 1 is a side elevation of an electrical cooking device embodying features of my invention;

Fig. 2 is a cross-sectional view on line 2—2 of Fig. 1;

Fig. 3 is a view generally similar to Fig. 1 but showing the jaws in their relative positions for engaging a sandwich roll, or the like;

Fig. 4 is a cross-sectional view on line 4—4 of Fig. 3; and

Fig. 5 is a cross-sectional view of a modified form of electrical cooking device embodying features of the invention.

Referring to the drawing, two suitably long jaw members 10, 12 have arcuate cross-section, as shown in Figs. 2 and 4, and the similar ends of each jaw are connected to different levers 14, 16 which are pivotally connected together at 18, intermediate of their ends. Lever 14 has the two arms 14a, 14b of which the arm 14a is connected to jaw member 10, and lever 16 has the two arms 16a, 16b of which the arm 16a is connected to jaw member 12. Lever arms 14b, 16b are biased in directions away from each other by coil spring 20 which is engaged between them, and the said arms may be manually pressed toward each other, pliers fashion, to actuate jaws 10, 12 in directions toward each other.

Preferably, the jaw 10 is larger than jaw 12, and provides a substantial trough or channel for reception therein of a frankfurter, a mass of hamburger, or other sandwich filler, which is to be cooked or heated. The jaw 12 is relatively shallow and substantially less in width than jaw 10, so that jaw 12 may be moved appreciably into the trough of jaw 10, as suggested in Fig. 2, where a frankfurter F is indicated by dotted lines engaged between the jaw members.

Trough 10 comprises a relatively rigid trough-shaped electrical heating unit 22 which extends over substantially the entire interior surface area of jaw 10. Unit 22 may be of any suitable known sheet-form of plate-form construction, and it preferably has an electrical socket 24 rigid thereon for reception of the prongs of a conventional plug 26 connected to each of the conductors at one end portion of an electric cord 28 which opposite end is equipped with a conventional plug 30 for plugging the device into any convenient electrical outlet. Socket 24 is shown mounted in a body 32 of insulation material which is suitably fixed on the heating unit 22, with its contacts connected to the resistance element or elements of unit 22. An opening or socket 34 in the insulating body 32 has an end portion of lever arm 14a removably engaged therein although, if desired, the arm 14a may be permanently secured to body 32. Heating unit 22 is exteriorly covered with asbestos 36, or other heat insulating material.

Jaw 12 also comprises a sheet-form or plate-form relatively rigid electrical heating unit 38 which is exteriorly covered with insulation 40. Unit 38 preferably has an electrical socket 42 rigid thereon for reception of a conventional plug 44 connected to each of the conductors of cord 28, the latter mentioned conductors having coiled excesses of length at 46 for a purpose which later will appear. Socket 42 is mounted in an insulating body 48 which is rigid on the unit 38, and a hole or socket 50 in body 48 removably receives an end portion of the lever arm 16a.

It will be apparent from the foregoing, that cord 28 and the pivoted levers 14, 16 may be disconnected from the jaws 10, 12, if desired, so that the jaws members 10, 12, the pivoted levers 14, 16, and the cord 28 may be loosely and compactly assembled together, for being carried on the person, in a bag, or in a lunch box.

A suitable supply of grease, or the like, for use in the cooking implement, conveniently may be held in a receptacle 52 which is shown associated with the lower jaw member 10. A housing 56 of plastic material, or any other suitable material, is shown secured to the jaw member 10 by the tubular rivets 58 which may be distributed along the member to serve the dual functions of retaining the housing on the member 10 and as drain passages through which grease drains from the interior of member 10 back into the grease-holding receptacle 52. The receptacle may be in the form of a long drawer which is openable through one end of housing 56. When the drawer is closed, grease is safely confined within the housing and drawer.

When cooking a frankfurter, it is desirable to have the jaw members 10, 12 engage the frankfurter substantially in parallelism. Similarly, when toasting a roll, the jaw members 10, 12 should engage the roll substantially in parallelism, notwithstanding that the jaw members will be spaced apart substantially more when engaging a roll than when engaging a frankfurter. This is illustrated in Fig. 4 where a roll is represented by dotted lines at R, as compared with Fig. 2. Hence, it is desirable to be able to adjust the pivoted levers 14, 16 to suit these different conditions. As shown the pivot at 18 is at a fixed location on lever 16, but lever 14 has a slot 60 therein whereby the pivot 18 may be shifted from one end to the other of slot 60. In Fig. 1 the pivot is at the lower end of slot 60 and the jaw members are in a generally parallel frankfurter-engaging relationship. In Fig. 3 the pivot 18 is shifted to the upper end of slot 60 and the jaw members are in a generally parallel roll-engaging relationship. Actually, the item being cooked or toasted can be squeezed and distorted somewhat by the jaw members to bring the heaters into contact with the entire length of the item even if the jaw members do not come into exact parallelism.

Fig. 5 shows a modification designed for cooking a frankfurter F and a roll R simultaneously. The lower jaw 10' has a cross-sectionally arcuate section of size to accommodate the roll R and another adjacent and smaller cross-sectionally arcuate section of size to accommodate the frankfurter F. The electric heating unit 22' in the roll section of the lower jaw 10' may be generally the same as the unit 22 and may be mounted on the lever 14, and electrically connected to the cord 28, as described in connection with Figs. 1–4. An integral lateral extension 22a of heating unit 22' serves as the heating unit in the frankfurter section, it being energized whenever unit 22' is energized.

The upper jaw 12' in Fig. 5 similarly has two laterally adjacent cross-sectionally arcuate sections of which the roll section may be mounted and electrically connected as described in connection with the jaw 12 in Figs. 1–4. A heating unit 38' in the roll section has the integral lateral extension 38a which constitutes the heater for the frankfurter section of upper jaw 12'. Assuming that a frankfurter F and roll R are arranged in the respective sections of lower jaw 10', closing of the jaws simultaneously engages the frankfurter and the roll to effectively cook the frankfurter and toast the roll.

Obviously, if desired, additional sections may be provided on a single implement for accommodating a plurality of frankfurters and a plurality of rolls simultaneously.

Various changes may be made in details of my disclosed cooking implement without departing from the spirit of the invention as defined in the claims, and it is intended that the patent shall cover, by suitable expression in the appended claims, whatever features of patentable novelty exist in the invention disclosed.

I claim as my invention:

1. An electrical cooking device comprising a pair of jaw members of which one has substantially semi-circular cross-section and the other is relatively narrow with a much larger radius of curvature and adapted in width to enter within the trough formed by said one of the jaws, a pair of pivotally connected levers, each lever having a different one of said jaw members thereon at one side of the pivot of the levers, and each lever having a handle portion at the other side of said pivot, whereby said jaw members may be actuated toward and from each other in response to relative movements of said handle portions of the levers, a separate electric heating unit at the inner surface portion of each said jaw member, a conductor cord connected to said heating units for completing an electrical circuit through each unit when said cord is plugged into an electrical outlet, and resilient means biasing said handle portions of the levers relatively in opposite directions about said pivot, said narrower jaw being movable into engagement with a relatively thick item of food resting in said trough of said one jaw and projecting out of the said trough a substantial amount beyond the side edges of said one jaw, and said narrower jaw also being movable into said trough between the side edges of said one jaw for engaging a relatively thin item of food resting in said trough.

2. An electrical cooking device comprising a pair of cross-sectionally arcuate jaw members having length substantially greater than their widths, one of said jaw members having substantially semi-circular cross-section, and the other being relatively narrow with a relatively much larger radius of curvature and adapted in width to enter within the trough formed by said one of the jaw members, a separate electric heating unit embodied in each said jaw and extending over substantially the entire areas of said jaws at the concave sides thereof, a pair of pivotally connected levers, each lever having one of its ends connected to a different one of said jaws, and each lever having a handle portion extending at the opposite side of the pivot of the levers whereby said jaws, with their concave sides toward each other, may be moved toward and from each other in response to actuations of said handle portions in opposite directions about said pivot, said pivoted levers being manually operable to bring said jaws substantially into parallelism with said relatively narrow jaw at least partially within the concavity of the other jaw, means at the pivot of said levers for adjusting the location of the pivot relative to only one of the levers whereby said levers become manually operable to bring said jaws substantially into parallelism with a relatively large spacing of the jaws; and means for electrically connecting each said heating unit to a source of electrical current.

3. An electrical cooking device as defined in claim 1, wherein a grease receptacle is removably fixed exteriorly on one of said jaws, and there is means defining distributed drip passages extending through said one jaw for drainage of grease from the concave side of said one jaw into the said receptacle.

4. An electrical cooking device as defined in claim 1, wherein each said jaw has an insulating body thereon and each said insulating body has two sockets therein of which one is an electrical socket for plug-in reception of a plug connector on said conductor cord, and the other is a relatively deep socket for removable reception therein of an insert end portion of one of said levers, whereby said cord and said pivoted levers may be separated from said jaws for conserving space during transportation and when storing said device.

5. An electrical cooking device comprising a pair of jaw members, a pair of pivotally connected levers, each lever having a different one of said jaw members thereon at one side of the pivot of the levers, and each lever having a handle portion at the other side of said pivot, whereby said jaw members may be actuated toward and from each other in response to relative movements of said handle portions of the levers, each said jaw having two adjacent cross-sectionally arcuate portions of size to accommodate respectively a frankfurther and a roll, and one of said jaws, when the jaws are in general parallelism, having the axes of its said two arcuate portions in two different planes generally parallel with the jaws, a separate electric heating unit for each said jaw, each said unit having exposed integral extent substantially over the entire interior concave surfaces of its two said portions, a conductor cord connected to said heating units for completing an electric circuit through each unit when said cord is plugged into an electrical outlet, and resilient means biasing said handle portions of the levers relatively in opposite directions about said pivot.

References Cited in the file of this patent

UNITED STATES PATENTS

| | | |
|---|---|---|
| 497,790 | Jenkins | May 23, 1893 |
| 1,848,030 | Sibley | Mar. 1, 1932 |
| 2,342,077 | Jepson | Feb. 15, 1944 |
| 2,470,854 | Kovac | May 24, 1949 |
| 2,514,281 | Hobbs | July 4, 1950 |